United States Patent [19]

Uchikawa et al.

[11] 4,132,558

[45] * Jan. 2, 1979

[54] PROCESS FOR TREATING A SLUDGE OR DRAINAGE CONTAINING CHROMIUM (VI) COMPOUNDS WITH A SOLIDIFYING AGENT

[75] Inventors: Hiroshi Uchikawa, Funabashi; Masao Shimoda, Tokyo, both of Japan

[73] Assignee: Onoda Cement Company, Limited, Yamaguchi, Japan

[*] Notice: The portion of the term of this patent subsequent to Mar. 30, 1993, has been disclaimed.

[21] Appl. No.: 713,135

[22] Filed: Aug. 10, 1976

[30] Foreign Application Priority Data

Aug. 20, 1975 [JP] Japan ................... 50-100152

[51] Int. Cl.$^2$ ............................................. C04B 7/32
[52] U.S. Cl. .................................. 106/104; 106/85; 106/89; 106/315

[58] Field of Search .............. 106/85, 89, 90, 104, 106/315

[56] References Cited

U.S. PATENT DOCUMENTS

| | | | |
|---|---|---|---|
| 3,782,992 | 1/1974 | Uchikawa et al. | 106/89 |
| 3,819,389 | 6/1974 | Uchikawa et al. | 106/89 |
| 3,864,138 | 2/1975 | Uchikawa et al. | 106/89 |
| 3,867,163 | 2/1975 | Uchikawa et al. | 106/315 |
| 3,947,283 | 3/1976 | Uchikawa et al. | 106/104 |

*Primary Examiner*—L. Dewayne Rutledge
*Assistant Examiner*—John P. Sheehan
*Attorney, Agent, or Firm*—Oblon, Fisher, Spivak, McClelland & Maier

[57] ABSTRACT

This invention relates to a process for treating a sludge or a drainage containing chromium (VI) compounds with a calcium haloaluminate bearing rapid hardening cement in a short period of time. The solidified material develops high strength and has shown a extremely $Cr^{6+}$ fixation.

9 Claims, No Drawings

PROCESS FOR TREATING A SLUDGE OR DRAINAGE CONTAINING CHROMIUM (VI) COMPOUNDS WITH A SOLIDIFYING AGENT

BACKGROUND OF THE INVENTION

1. Field of the Invention

This invention relates to a process for treating a sludge or a drainage containing chromium (VI) compounds with a solidifying agent. More particularly, it relates to solidify the sludge or the drainage with a calcium haloaluminate bearing rapid hardening cement in a short period of time.

2. Description of the Prior Art:

Chromium (VI) compounds are contained in amounts of more than several ppm as $Cr^{6+}$ in a sludge after recovery of chromium from chromium ore or in a drainage discharged from a chromium plating factory, a tanned leather factory and the like and therefore the dumping of the sludge and the drainage causes an environmental pollution. Although these may be solidified by employing portland cements such as normal portland cement, high early-strength portland cement and portland mixed cements such as fly-ash cement, blast-furnace slag cement and silica cement, it is necessary to reduce $Cr^{6+}$ to $Cr^{3+}$ in order to produce solidified materials of greater strength by the use of the above-mentioned cements.

SUMMARY OF THE INVENTION:

As a result of further studies for improvements in the solidification of the sludge and the drainage containing chromium (VI) compounds without reducing $Cr^{6+}$ therein to $Cr^{3+}$ by the use of cement, the inventors have found that a rapid hardening cement containing calcium haloaluminate has better sludge $6+$-fixing ability and a material which solidified the sluge and the drainage with the above-mentioned cement developes high strength, and further have found that the addition of strength accelerators, such as sulfites, sulfates, nitrates, organic carboxylic acids, boric acid or their salts to the rapid hardening cement containing calcium haloaluminate provides solidified materials of higher strength having better $Cr^{6+}$-fixing ability.

This invention is based on these findings and relates to a process for treating a sludge or a drainage containing chromium (VI) compounds with a rapid hardening cement containing calcium haloaluminate or a calcium haloaluminate to which is added a strength accelerator.

DETAILED DESCRIPTION OF THE PREFERRED EMBODIMENTS

According to the invention, the rapid hardening cement containing calcium haloaluminate is prepared by adding anhydrous gypsum or a mixture of anhydrous gypsum and semihydrate gypsum to clinker containing $11CaO.7Al_2O_3 \cdot CaX_2$ (X is a halogen), $3CaO.SiO_2$ solid solution, $2CaO.SiO_2$ solid solution, $2CaO.Fe_2O_3 \cdot 6CaO.2Al_2O_3 \cdot Fe_2O_3$ iron solid solution and the like, so that $Al_2O_3/SO_3$ weight ratio is 0.4 - 1.8 based on $SO_3$ and crushing the resulting mixture. The cement usually employed contains 5 - 60 weight %, preferably 15 - 30 weight % of $11CaO.7Al_2O_3.CaX_2$.

The strength accelerator which can be added to the rapid hardening cement includes sulfates, nitrates and chlorides such as ferrous sulfate, ferrous nitrate, ferrous chloride, sodium sulfate, potassium sulfate, sodium nitrate, potassium nitrate, sodium chloride, and potassium chloride; sulfites such as sodium sulfite, potassium sulfite, sodium hydrogen sulfite and calcium sulfite; boric acid or its salts; bicarbonate such as sodium bicarbonate and potassium bicarbonate; silicic acid salts such as water glass; silicofluorides such as sodium silicofluoride and barium silicofluoride; quicklime or hydrated lime; phosphoric acid salts such as sodium dihydrogen phosphate, potassium orthophosphate, sodium pyrophosphate and potassium tripolyphosphate; organic carboxylic acids such as oxalic acid, formic acid, acetic acid and citric acid; saccharides such as galactose and sucrose; lignin sulfonic acid salts such as sodium lignin sulfonate and potassium lignin sulfonate; higher alcohol esters of sulfuric acid such as nonyl alcohol ester of sulfuric acid and dodecyl alcohol ester of sulfuric acid; alkylarylsulfonic acid salts such as sodium benzensulfonate and potassium benzensulfonate. The adding proportions of the strength accelerator to the rapid hardening cement are shown below in inner parts: sulfates, nitrates and chlorides and sulfites, 1 - 35 weight %, preferably 5 - 15 weight %; boric acid or its salts, bicarbonates, silicic acid salts, silico fluorides, quicklime, hydrated lime, phosphoric acid salts, below 3 weight %, preferably 0.1 - 1 weight %; organic carboxylic acids, saccharides, lignin sulfonic acid salts, higher alcohol esters of sulfuric acid, alkylarylsulfonic acid salts, below 3 weight %, preferably 0.1 - 1 weight %.

In this invention, the adding proportion of the solidifying agent to a sludge and a drainage containing chromium (VI) compounds can not be uniformly determined, since it depends upon the amounts of the chromium (VI) compounds in the sludge or the drainage, the desired strength of the solidified material and the $Cr^{6+}$-fixing ability of the solidifying agent. Some examples are given: In the case of solidifying a sludge in which moisture content (water/solid ratio) is 100 - 800 weight % and $Cr^{6+}$ is contained below 50,000 ppm, the solidifying agent of this invention is added 5 - 100 parts by weight to 100 parts by weight of the sludge, and in the case of the drainage in which $Cr^{6+}$ is contained below 50,000 ppm, the solidifying agent of this invention is added 30 - 300 parts by weight to 100 parts by weight of the drainage.

Although it is not clear why the invention permits the solidification of the chromium (VI) compounds containing sludge or drainage with a marked strength and $Cr^{6+}$-fixing ability, it may be considered that calcium haloaluminate in the solidifying agent eliminates the toxic action of $Cr^{6+}$ against portland cement.

According to the invention, it is not necessary to reduce $Cr^{6+}$ to $Cr^{3+}$ in solidifying the chromium (VI) compounds containing sludge or drainage as distinct from the case where portland cement is utilized, and as a result the process for solidifying the sludge and the drainage is simplified to provide solidified materials of high strength.

Examples of this invention are given below:

Table 1 shows the compositions and fineness of calcium haloaluminate containing rapid hardening cement (Jet cement, a product of Onoda Cement Company, Ltd.) and normal portland cement employed in the examples and comparative examples.

Table 1

|  | Fineness Blaine $(cm^2/g)$ | Mineral compositions (%) | | | | | $Al_2O_3/SO_3)$ |
| --- | --- | --- | --- | --- | --- | --- | --- |
|  |  | $C_{11}A_7 \cdot CaF_2$ | $C_3S$ | $C_2S$ | $C_3A$ | $C_4AF$ |  |
| Jet cement | 5300 | 20.6 | 50.7 | 1.7 | — | 4.7 | 1.1 |
| Normal portland cement | 3200 | 0.0 | 52.7 | 23.9 | 8.2 | 9.7 | 3.2 |

Note: $C_{11}A_7 \cdot CaF_2$ is short for $11CaO \cdot 7Al_2O_3 \cdot CaF_2$, $C_3S$, $3CaO \cdot SiO_2$; $C_2S$, $2CaO \cdot SiO_2$; $C_3A$, $3CaO \cdot Al_2O_3$ and $C_4AF$, $4CaO \cdot Al_2O_3 \cdot Fe_2O_3$, respectively.

EXAMPLE 1

Solidified materials were produced by mixing 100 parts by weight of chromium (VI) compounds - containing drainage (moisture content 162 weight %, $Cr^{6+}$ about 3,000 ppm) discharged from a plating factory with 20 parts by weight of i) Jet cement; ii) 93 weight % of Jet cement and 7 weight % of ferrous nitrate and as comparative example with 20 parts by weight of iii) normal portland cement; iv) 93 weight % of normal portland cement and 7 weight % of ferrous nitrate. The unconfined compressive strength of the solidified materials and the concentrations of $Cr^{6+}$ dissolved in water from the solidified materials are shown in Table 2. The latters in this table and the subsequent tables were measured according to notification No.22 of the Environment Agency in Japan.

Table 2

|  | Unconfined compressive strength $(kg/cm^2)$ | | | Concentration of $Cr^{6+}$ dissolved in water from the solidified material (ppm) | | |
| --- | --- | --- | --- | --- | --- | --- |
|  | 1 day | 3 days | 28 days | 1 day | 3 days | 28 days |
| i) Jet cement | 35.4 | 38.2 | 40.5 | 1.24 | 1.22 | 1.25 |
| ii) Jet cement + ferrous nitrate | 35.8 | 40.1 | 42.3 | 0.10 | 0.12 | 0.10 |
| iii) Normal portland cement | 1.5 | 1.6 | 1.6 | 12.70 | 11.70 | 11.80 |
| iv) Normal portland cement + ferrous nitrate | 2.3 | 2.3 | 2.4 | 10.01 | 9.75 | 9.80 |

EXAMPLE 2

Solidified materials were produced by mixing 100 parts by weight of $Cr^{6+}$- containing sludge after recovery of chromium ore which contains $Cr^{6+}$ content about 25,000 ppm with 25 parts by weight of i) Jet cement, ii) 95 weight % of Jet cement and 5 weight % of sodium sulfite, iii) 99.5 weight % of Jet cement and 0.5 weight % of citric acid, iv) 94.5 weight % of Jet cement, 5 weight % of sodium sulfite and 0.5 weight % of citric acid, and as comparative examples with 25 parts by weight of v) normal portland cement, vi) 95 weight % of normal portland cement and 5 weight % of sodium sulfite, vii) 99.5 weight % of normal portland cement and 0.5 weight % of citric acid and viii) 94.5 weight % of normal portland cement, 5 weight % of sodium sulfite and 0.5 weight % of citric acid. The unconfined compressive strength of the solidified materials and the concentrations of $Cr^{6+}$ dissolved in water from the solidified materials are shown in Table 3.

Table 3

|  |  | Unconfined compressive strength $(kg/cm^2)$ | | | Concentration of $Cr^{6+}$ dissolved in water from the solidified material (ppm) | | |
| --- | --- | --- | --- | --- | --- | --- | --- |
|  |  | 1 day | 3 days | 28 days | 1 day | 3 days | 28 days |
| i) | Jet cement | 42.1 | 43.5 | 49.2 | 1.25 | 1.34 | 1.48 |
| ii) | Jet cement + sodium sulfite | 43.2 | 45.3 | 52.1 | 0.25 | 0.25 | 0.21 |
| iii) | Jet cement + citric acid | 45.1 | 48.2 | 50.1 | 0.25 | 0.26 | 0.25 |
| iv) | Jet cement + sodium sulfite + citric acid | 45.1 | 49.8 | 61.2 | 0.19 | 0.18 | 0.19 |
| v) | Normal portland cement | 2.4 | 2.7 | 2.7 | 50.1 | 48.3 | 48.9 |
| vi) | Normal portland cement + sodium sulfite | 2.5 | 3.1 | 3.2 | 42.3 | 40.1 | 39.7 |
| vii) | Normal portland cement + citric acid | 1.8 | 1.7 | 1.7 | 49.8 | 50.2 | 50.9 |
| viii) | Normal portland cement + sodium sulfite + citric acid | 2.5 | 2.8 | 2.9 | 45.5 | 44.3 | 44.8 |

EXAMPLE 3

Solidified materials were produced by mixing 100 parts by weight of $Cr^{6+}$— containing sludge employed in Example 2 with 25 parts by weight of a mixture of 94.5 weight % of Jet cement, 5 weight % of ferrous sulfate and 0.5 weight % of the following strength accelerators: boric acid, sodium bicarbonate, water glass, sodium silico fluoride, sucrose, sodium dihydrogen phosphate, sodium lignin sulfonate, nonyl alcohol ester of sulfuric acid, sodium benzensulfonate, quick-lime or hydrated lime. The unconfined compressive strength of the solidified materials and concentrations of $Cr^{6+}$ dissolved in water from the solidified materials are shown in Table 4.

Table 4

|  |  |  | Unconfined compressive strength $(kg/cm^2)$ | | | Concentration of $Cr^{6+}$ dissolved in water from the solidified material (ppm) | | |
| --- | --- | --- | --- | --- | --- | --- | --- | --- |
|  |  |  | 1 day | 3 days | 28 days | 1 day | 3 days | 28 days |
| Jet cement + | Ferrous sulfate | + Boric acid | 44.5 | 50.2 | 60.1 | 0.15 | 0.15 | 0.16 |
| Jet cement + | Ferrous sulfate | + Sodium bicarbonate | 46.2 | 53.2 | 62.0 | 0.16 | 0.16 | 0.16 |
| Jet cement + | Ferrous sulfate | + water glass | 45.5 | 51.2 | 59.2 | 0.18 | 0.19 | 0.18 |
| Jet cement + | Ferrous sulfate | + Sodium silicofluoride | 44.3 | 51.3 | 58.9 | 0.19 | 0.19 | 0.15 |
| Jet cement + | Ferrous sulfate | + sucrose | 43.7 | 47.9 | 57.9 | 0.14 | 0.16 | 0.19 |

Table 4-continued

| | | | Unconfined compressive strength (kg/cm²) | | | Concentration of Cr⁶⁺ dissolved in water from the solidified material (ppm) | | |
|---|---|---|---|---|---|---|---|---|
| | | | 1 day | 3 days | 28 days | 1 day | 3 days | 28 days |
| Jet cement + | Ferrous sulfate | + Sodium dihydrogen phosphate | 45.6 | 50.0 | 60.8 | 0.15 | 0.14 | 0.15 |
| Jet cement + | Ferrous sulfate | + Sodium lignin sulfonate | 44.5 | 49.9 | 62.4 | 0.19 | 0.20 | 0.17 |
| Jet cement + | Ferrous sulfate | + Nonyl alcohol ester of sulfuric acid | 45.2 | 48.7 | 60.2 | 0.17 | 0.16 | 0.17 |
| Jet cement + | Ferrous sulfate | + Sodium benzensulfonate | 43.2 | 50.0 | 57.9 | 0.14 | 0.15 | 0.15 |
| Jet cement + | Ferrous sulfate | + quick-lime | 45.0 | 49.2 | 59.8 | 0.15 | 0.16 | 0.15 |
| Jet cement + | Ferrous sulfate | + hydrated lime | 46.0 | 50.1 | 56.9 | 0.19 | 0.20 | 0.21 |

EXAMPLE 4

Solidified materials were produced by mixing 100 parts by weight of $Cr^{6+}$- containing sludge employed in Example 2 with 25 parts by weight of a mixture of 90 weight % of Jet cement, 5 weight % of ferrous sulfate and 5 weight % of the following strength accelerators; sodium sulfate, sodium nitrate or sodium chloride. The unconfined compressive strength of the solidified materials and concentrations of $Cr^{6+}$ dissolved in water from the solidified materials are shown in Table 5.

Table 5

| | | | Unconfined compressive strength (kg/cm²) | | | Concentration $Cr^{6+}$ dissolved in water from the solidified material (ppm) | | |
|---|---|---|---|---|---|---|---|---|
| | | | 1 day | 3 days | 28 days | 1 day | 3 days | 28 days |
| Jet cement | + Ferrous sulfate | + Sodium sulfate | 45.2 | 49.7 | 59.6 | 0.20 | 0.19 | 0.18 |
| " | " | + Sodium nitrate | 47.2 | 49.9 | 61.2 | 0.15 | 0.15 | 0.15 |
| " | " | + Sodium chloride | 45.3 | 50.1 | 62.5 | 0.13 | 0.12 | 0.15 |

What is claimed is:

1. A process for solidifying an industrial waste sludge containing chromium (VI) compounds, comprising mixing the sludge and a rapid hardening cement consisting of from 5 to 60% by weight of 11 CaO·7Al₂O₃·CaX₂, where X is halogen; and 3 CaO·SiO₂ solid solution, 2 CaO·Fe₂O₃·6 CaO·2 Al₂O₃·Fe₂O₃ iron solid solution and a material selected from the group consisting of anhydrous gypsum and a mixture of anhydrous gypsum and hemihydrate gypsum, in an amount such that the weight ratio of Al₂O₃/SO₃ in the cement is 0.4 to 1.8 based on SO₃.

2. A process for solidifying a sludge containing chromium (VI) compounds obtained from the waste from the recovery of chromium from chromium ore, or the waste discharged from a chromium plating factory or from a leather tanning factory, said process comprising mixing the sludge and a rapid hardening cement consisting of from 5-60% by weight of 11CaO·7Al₂O₃·CaX₂, where X is halogen; and 3 CaO·SiO₂ solid solution, 2 CaOSiO₂ solid solution 2 CaO·Fe₂O₃ - 6 CaO·2 Al₂O₃·Fe₂O₃ iron solution; and a material selected from the group consisting of anhydrous gypsum and a mixture of anhydrous gypsum and hemihydrate gypsum, in an amount such that the weight ratio of Al₂O₃/SO₃ in the cement is 0.4 to 1.8 based on SO₃.

3. The process of claim 2, wherein the rapid hardening cement includes 15 to 30% by weight of the 11 CaO·7 Al₂O₃·CaX₂, X being halogen.

4. The process of claim 2, wherein at least one member selected from the group consisting of nitrates and chlorides of iron (II), sodium, and potassium; sulfites of sodium, potassium and calcium; boric acid and its salts; bicarbonates of sodium and potassium; silicic acid salts; silico-fluorides of sodium and barium; quicklime, and slaked lime, phosphoric acid salts of sodium and potassium; organic carboxylic acids, saccharrides; lignin sulfonic acid salts; higher alcohol esters of sulfuric acid; and alkylarylsulfonates, is added to the rapid hardening cement in order to accelerate the strength of the cement.

5. The process of claim 4, wherein the sulfates, nitrates, sulfites and chlorides recited therein are added to the rapid hardening cement in amounts of from 1 to 35 weight percent thereof.

6. The process of claim 4, wherein the boric acid and its salt, bicarbonates, silicic acid salts, silicofluorides, quick lime, hydrated lime, and phosphoric acid salts recited in claim 14 are added to the rapid hardening cement in amounts less than 3% by weight thereof.

7. The process of claim 4, wherein the organic carboxylic acids, saccharides, lignin sulfonic acid salts, higher alcohol esters of sulfuric acid and alkaryl sulfonic acid salts recited in claim 14 are added to the rapid hardening cement in amounts less than 3 percent by weight thereof.

8. The process of claim 2, wherein from 5–100 parts by weight of the rapid hardening cement is added to 100 parts by weight of the sludge which has a moisture content (water/solid ratio) of from 100–800 percent and contains $Cr^{6+}$ in amounts below 50,000 ppm.

9. The process of claim 2, wherein from 30–300 parts by weight of the rapid hardening cement is added for 100 parts by weight of the waste sludge containing below 50,000 ppm of $Cr^{6+}$.

* * * * *